United States Patent Office 3,436,367
Patented Apr. 1, 1969

3,436,367
PROCESS AND COMPOSITION FOR IMPROVING METAL MARKING PROPERTIES IN POLYESTER RESIN LOW GLOSS COATINGS
James R. McInerney, San Salvador, El Salvador, assignor to The Sherwin-Williams Company, Cleveland, Ohio, a corporation of Ohio
No Drawing. Filed Aug. 4, 1967, Ser. No. 658,334
Int. Cl. C08g 51/04, 39/00; B44d 1/36
U.S. Cl. 260—40
14 Claims

ABSTRACT OF THE DISCLOSURE

Coating composition containing polyester resin, secondary or tertiary amine marproofing additive, and pigment in an organic liquid or vehicle or thermoplastic resin organosol. The composition is applied to substrates and baked to cure the resin. Improved metal-marking properties are achieved which increase mar resistance of flexible films during subsequent forming of the substrate against hard surfaces. The composition and process are useful for coil coating operations for producing metal stock having decorative or protective finish.

DESCRIPTION OF THE INVENTION

A coating composition having excellent resistance to "metal marking," when applied to metal sheet or similar coil coating uses, has been found. Numerous manufacturing industries have discovered that precoated metal stock is advantageous in the shaping and finishing of articles of manufacture such as household appliances, building materials, etc. Such precoated stock mterials have a decorative or protective paint layer uniformly applied to the substrate by an efficient production process which avoids the problems of painting the shaped article subsequent to a forming operation. Thus, a layer of organic resin containing a pigment is applied to the substrate by spraying, brushing or roller coating. Because the most common operations employing this type of coating process feed a metal substrate from a coil of metal strip, this process is frequently called coil coating, and the paints used in the process are referred to as coil coating compositions. This term is used in the industry to indicate those paints formulated to produce a flexible, adherent layer which can assume the shape given to the substrate.

Such coatings should have high resistance to scratching, marring, and metal marking. The usual properties of durability, color stability, thermal resistance, and fluidity during application can be achieved in coil coatings, but metal marking has proven to be a recurrent problem in such organic resin surfaces. This phenomenon occurs when a hard object is rubbed against the coating surface, as happens when the coated stock is bent, swaged, pressed or otherwise formed in contact with a hard surface such as a metal die. The pigment in the coating surface is abraded or polished by the hard object, leaving a discolored mark on the painted surface. This is especially noticeable with low gloss white paints, where the metal marking results in a blackened area over the surface contacted with a hard object.

The tendency of a particular film to be susceptible to metal marking is closely related to the pigment volume concentration. This is the ratio of the volume of total pigment to the volume of total non-volatile matter in a paint. High pigment volume is generally associated with low gloss coatings. In the dried film there is little if any resin covering the pigment at the film surface. Thus, the problem of metal marking is believed to be dependent upon the amount of resin present at the surface of the film. It has been discovered that a substantial reduction in the tendency of a pigmented organic resin film containing a polyester is realized when the coating composition from which the film is applied contains a small amount of secondary or tertiary amine. These amine additives are attributed with a property which achieves wetting or covering of the pigment by the binder resin at the film surface. In the amounts suggested, these amines do not substantially alter the other properties of the film, except that certain combinations of resins and amines in the paint formulation can result in discoloring the film. The class of amines which possess mark-reducing properties includes secondary and tertiary amines containing 2 to 12 carbon atoms. These correspond to the structural formula:

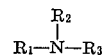

where $R_1$ and $R_2$ are selected from the group consisting of lower alkyl radicals and lower hydroxyalkyl (alkanol) radicals, and where $R_3$ is selected from hydrogen, lower alkyl, and hydroxyalkyl radicals. Typical lower alkyl substituents include methyl, ethyl, isopropyl, butyl, etc. Typical hydroxyalkyl substituents include methanol, ethanol, isopropanol, radicals, etc. The best results were obtained with the $C_4$ to $C_6$ tertiary amines, especially triethylamine and dimethylethanolamine. Substantial improvements in metal marking properties were found for dimethylamine, dibutylisopropanolamine, dibutylamine, diisopropylamine, and triisopropylamine.

The amount of additive for reducing the metal marking is not critical. For ordinary coil coating compositions containing 20 to 50 weight percent of an organic liquid carrier, 15 to 65 percent of binder resin solids, up to 40 percent pigment materials, about 0.15 to 40 grams of additive per liter of coating composition is recommended. The optimum amount is dependent upon many factors, especially the type of binder resin and pigments used in the formulation. For most of the polyester resins tried, about 0.3 g./l. was needed to produce a useful change in the metal marking.

The polymeric portion of the coating composition includes a polyester. This resin makes up from about 5 percent to 100% of the polymer solids. The polyester may be mixed with other polymers, especially thermoplastic particles to constitute the resin binder. For coil coating, a cured film containing fused polyvinyl chloride and polyester has excellent properties. In the coating composition, the polyvinyl chloride particles are suspended in the organic carrier, while the polyester can be present as a soluble prepolymer which is cross-linked to make the cured film resistant to solvents. Such suspensions are generally called organosols.

The polyester resins employed in this invention are either oil-free polyester resins or oil-modified polyester resins. These polymers are prepared by reacting organic dicarboxylic acids or anhydrides or lower alkyl esters of dicarboxylic acids with polyhydric alcohols. Mixtures of acids or polyols can be and are often used.

Typical dicarboxylic acids which can be employed in preparing the polyesters include: o-phthalic or its anhydride, isophthalic, adipic, malonic, azelaic, tetrahydrophthalic and its anhydride, hexahydrophthalic and its anhydride, endomethylene tetrahydrophthalic and its anhydride, hexachloroendomethylene tetrahydrophthalic and its anhydride, sebacic acid dimerized vegetable fatty acids, hydrogenated dimerized vegetable fatty acids and digylcolic or thiodiglycolic acid. Lower alkyl esters of these dibasic acids made by transesterification can be used. The preferred dibasic acids in the practice of this invention are isophthalic blended with orthophthalic and/or adipic or azelaic as dictated by the flexibility required in the coating formulation.

The following diols can be used in the polyhydroxy component of the polyester resin: butylene glycol 1,4-bis-2-hydroxyethyl thioether; butylene glycol 1,3; 1,4-cyclohexanedimethanol; dibromoneopentyl glycol; diethylene glycol; dipropylene glycol; bis-2-hydroxyethoxy Bisphenol A; 2,2-dimethyl-3-hydroxy propyl 2,2-dimethyl 1-3-hydroxy propionate; ethylene glycol, 1,6-hexanediol; hydrogenated Bisphenol A; methyl diethanolamine; neopentyl glycol; 1,5-pentanediol; propylene glycol; 2,2,4-trimethyl-3-pentanediol and ethoxylated or propoxylated diols or diamines. Also, monooxiranes may be utilized, such as, glycidyl esters of monobasic carboxylic acids or glycidyl ethers of monohydric alcohols. In addition, alkylene monooxides, such as propylene oxide, butylene oxide or oxides of the alpha olefins, can be used. The preferred diols are neopentyl glycol and blends of neopentyl glycol with ethylene glycol, propylene glycol or 2,2,4-trimethyl-1,3-pentanediol.

The following polyols containing at least three hydroxyl groups can be employed in making polyester prepolymers having free hydroxyl groups: dipentaerythritol; glycerine; 1,2,6-hexanetriol; pentaerythritol; sorbitol; hydrogenated sugars; trimethylol ethane; trimethylol propane and various ethoxylated and propoxylated triols and tetrols.

Where an oil-modified polyester is desired, suitable oil modifiers are: soybean, tung, oiticica, linseed, and dehydrated castor, the fatty acids of these oils, and mixtures of such oils and/or acids with saturated acids and oils (e.g., coconut oil). In oil-modified polyester resins, the unsaturated oil constitutes about 20% to 60% by weight of the polyester. Oil modified polymeric polyester resins made from phthalic anhydride, glycerine and a color retentive oil, such as coconut oil or dehydrated castor oil are satisfactory but the best flexibility is not usually obtained with the oil-modified polyester resins.

The preferred polyester resins are synthesized from saturated aliphatic or aromatic polycarboxylic acids, but unsaturated polyesters (e.g., maleic adducts) are also suitable, and can be cross-linked with styrene. Commercially available polyesters may be used, or polymeric materials can be made according to the examples hereafter presented. The preferred polyesters have free hydroxyl groups which can react with melamine or urea/formaldehyde cross-linking agents.

Because the pigment content of the dried films is an important factor in determining the metal marking properties of a coated surface, this component of the compositions should be considered. The amount of improvement derived from the mark-reducing additive is dependent upon the amount and chemical composition of the pigment as well as the resin binder. The hiding power of titanium dioxide pigments makes this compound quite important in decorative paints. Great improvement of metal marking is realized for this pigment. A preferred pigment is a rutile $TiO_2$ such as Du Pont R–960. Other suitable pigments are phthalocyanine blue, phthalocyanine green, chrome yellow, chrome orange, ferrite yellow, red iron oxide, carbon black, chrome oxide green, quinacridone red and quinacridone violet. The amount of hiding pigment in the coating composition will vary depending upon the type of pigment and ordinarily may be as low as 3% by weight for a dark pigment and up to 40% by weight for a white pigment. Inert and extender pigments, e.g., silica aerogels, talcs, and diatomaceous silica, commonly used in organic coatings, can be employed.

Improved marking properties can be achieved with the amine additive in dried films having a pigment volume concentration (P.V.C.) from about 7% to 40%. Most coil coating paints have a P.V.C. value of about 12 to 33%, with about 20 to 25% being the optimum range for most low gloss surfaces. Generally, the higher P.V.C. values present the least metal marking resistance, and higher amounts of amine additive may be necessary to achieve the desired results. For films containing about 20 to 25 vol. percent pigment and the binder solids containing about 20 parts of polyester for each 80 parts of polyvinyl chloride resin, a suitable weight ratio of 20 parts polyester per part of amine additive in the organosol gives excellent resistance to metal marking in the dry film. These approximate ratios represent preferred embodiments of the invention and may be modified for a particular polymeric binder, pigment, carrier liquid, etc.

The liquid carrier in which the resin binder solids, pigment, amine mark reducing agent, and other materials are dispersed or dissolved does not appear to have a critical relation to the invention. A wide variety of organic liquids are usable. These include aliphatic hydrocarbons, aromatic naphtha, xylene, ketones, ethers.

The preferred liquid carriers or solvents include high boiling ketones, for example, diisobutyl ketone and/or isobutylheptyl ketone, mixed with a high boiling aromatic or aliphatic naphtha. Some medium boiling solvents may be included. Also, the ketones may be replaced with other oxygenated solvents.

For industrial coil coating operations, reverse roller coating is a desirable method of application. In this method foaming of the coating composition can become troublesome. Organic liquid carriers are ordinarily superior to aqueous carriers in this respect. Nevertheless, for some operations, anti-foaming agents may be desirable. Other materials may be added to the coating composition to alter some specific properties. Some coating compositions, especially those containing thermoplastic polymers, may contain plasticizers, for example, dibutylphthalate, diisodecylphthalate, dioctylphthalate, butylbenzylphthalate, Paraplex G–25 linear polyester, or Paraplex G–62 epoxidized oil. Other modifiers include heat stabilizers, such as barium, cadmium and zinc organic salts (metal soaps), or emulsifying agents, such as lecithin.

The secondary or tertiary amine additive content can be expressed in several ways. There appears to be no criticality in the amount of amine additive that is included in the coating composition above the amount sufficient for improving the metal marking properties of the dried film. The polyester/additive ratio varies from about 2:1 to about 100:1 for most compositions; while the preferred ratio is less than 50:1. When thermoplastic resin particles are used in addition to the polyester, total polymer/additive may be considerably higher than 100:1. The optimum ratio of polyester resin to amine additive should be determined for the particular coating composition used. In the examples given, coating compositions containing no amine mark-reducing additive are compared to identical compositions, but containing a sufficient additive to improve the marking resistance. The additive content is expressed throughout the examples as percent additive; this relates to the parts by weight of additive. Unless otherwise specified, the coating compositions in the various examples are given in weight percent.

Example I

A polyester prepolymer is made by reacting 20.9 parts by weight of adipic acid, 36.5 parts neopentyl glycol, 35.6 parts isophthalic acid, and 7.2 parts trimethylol propane. A typical reaction includes the following steps: (1) The adipic acid and neopentyl glycol are heated to 300° F. for 1 hour in a reflux-type reactor kettle. (2) The isophthalic acid is added and the mixture heated to 460° F. for 6 hours while water is collected. (3) The trimethylol propane is added at 390° F. and this temperature is maintained for 1 hour. (4) To the above prepolymer is added 1.6 parts xylene and 3.6 parts neopentyl glycol, and the temperature is raised to 460° F. during 4 hours. The prepolymer has an acid value of about 9 to 12 (preferably 10) and a hydroxyl number of about 2.3 to 3.5. The reaction mixture is then dropped into a solvent thinner consisting of 4 parts xylene and 1 part ethylene glycol monobutyl ether (butyl "Cellosolve"). The polyester prepolymer mixture consists of 60 weight percent resin and 40 percent volatile solvent.

A coating composition is formulated using 45.80% of the above prepolymer mixture, 4.27% of an alkoxyalkyl melamine cross-linking agent (Cymel 301), 35.60% titanium dioxide pigment (OR640A), 7.12% silica aerogel (Syloid 404), 0.24% soya lecithin, and 7.11% aromatic naphtha (Solvesso 150). A thin film of this composition is coated onto an aluminum substrate. Another film of this composition with 0.6% dimethylethanol amine is coated alongside the first, and both the first (control) coating and the second (additive-containing) coating are cured by heating to about 500° F. for about 50 seconds. The pigment volume is about 30.4 vol. percent.

The control coating is easily marked by a hard object, but the additive-containing coating shows great improvement in metal-marking properties. The polyester/additive ratio is 45.7:1, and this represents a typical coating wherein the polymeric materials are essentially all polyesters. During the curing step, the volatile components are evaporated from the film, and the cross-linking of the polyester prepolymer is effected. A flexible, white film having sufficient flexibility, mar-resistance, hiding power and durability for coil coating operations is obtained.

Example II

A coating composition similar to that of Example I is made containing a relatively large portion of thermoplastic resin in an organosol mixture. The polyester prepolymer mixture containing 60% non-volatile materials described in Example I is included in the amount of 29.20%. Other components of the coating composition are 25.10% polyvinyl chloride particles (Diamond Alkali PVC-71) having a size range of about 5 to 10 microns, 7.50% diisodecyl phthalate plasticizer, 2.50% hexakis (methoxymethyl) melamine cross-linking agent, 0.75% polyethylene glycol monolaurate, 0.50% soya lecithin, 1.26% petrolatum wax, 1.50% metal soap heat stabilizer (Ferro 6-V-6A), 7.90% diisobutyl ketone, 7.90% trimethylnonanone, 2.51% isophorone, and 13.81% aromatic naphtha having a lower boiling point of 150° F. The control and additive-containing films are baked as in Example I.

The improvement of metal marking properties using a 0.6% dimethylethanol amine additive over that of the control coating is very good. The polyester/additive ratio is 8.8:1 for this example, and the total resin solids in the cured film (prepolymer+cross-linking agent+thermoplastic resin) contains about 44% cross-linked polyester. The pigment volume concentration is about 20 vol. percent.

Example III

An organosol coating composition containing a silicone-modified polyester prepolymer is formulated with a thermoplastic resin having a particle size of about 2 microns.

The prepolymer is made by reacting 7.25 parts by weight of adipic acid, 27.60 parts isophthalic acid, 31.20 parts neopentyl glycol, 3.66 parts trimethylolpropane, and 30.00 parts silicone material (Dow-Corning Z6188). The prepolymer mixture is thinned with aromatic naphtha (Solvesso 150) to a non-volatile content of 60.4%.

The organosol contains 31.80% prepolymer mixture, 2.67% hexakis (methoxymethyl) melamine, 19.10% polyvinyl chloride resin (QXNV-1), 0.57% polyethylene glycol (400) monolaurate, 0.28% soya lecithin, 27.70% TiO$_2$ pigment (Du Pont R902), 2.77% Sb$_2$O$_3$ pigment, 0.95% isophorone, 4.48% diisobutyl ketone, 4.48% trimethylnonanone, and 5.73% aromatic naphtha.

A baked film of the organosol coating containing 1.3% dimethylethanolamine (polyester/additive ratio=14.8:1) gives greatly improved metal-marking resistance over that of the control coating. The pigment volume concentration is 18.4 vol. percent; and the baked film is flexible, durable, and mar resistant.

Example IV

An organosol coating composition is made from cross-linked polyester and thermoplastic resin solids. The polyester is produced by reacting 16.50 parts of adipic acid, 35.00 parts neopentyl glycol, 28.60 parts isophthalic acid, and 7.31 parts monoisobutyl phthalate. The linear polyester is cross-linked by heating with 12.30 parts alkoxylalkyl melamine. The cross-linked polyester is thinned with a solvent consisting of 80% xylene and 20% ethylene glycol monobutyl ether to a non-volatile content of 60.8%.

The polyester is incorporated in an organosol containing 22.00% polyester mixture, 17.00% polyvinyl chloride particles (QYNV-1), 5.10% diisodecyl phthalate, 27.10% TiO$_2$, 2.71% Sb$_2$O$_3$, 1.79% silica aerogel, 0.54% polyethylene glycol monolaurate, 0.35% lecithin, 0.89% petrolatum wax, 1.08% air-release vinyl stabilizer (Nuostabe V-1060), 5.30% diisobutyl ketone, 5.10% trimethylnonanone, 1.78% isophorone, and 9.33% aromatic naphtha.

A baked film of the organosol coating containing 2.0% dimethylethanol amine (polyester/additive=6.5:1) provides excellent metal marking properties. It is concluded that cross-linking can be effected before or after the resin is coated on a substrate with substantial improvement in metal marking resistance. The pigment volume concentration is 21.4 vol. percent.

Example V

A polyester prepolymer is made by reacting 18.0 parts by weight of dimethylolpropionic acid, 24.5 parts neopentyl glycol, 8.1 parts trimethylol ethane, 19.6 parts azelaic acid, and 29.85 parts phthalic anhydride. A prepolymer mixture is made with 87.6% non-volatile material and 12.4% ethylene glycol monobutyl ether.

An organosol is made by mixing 19.50% of the prepolymer mixture, 1.68% hexakis (methoxymethyl) melamine, 23.20% polyvinyl chloride particles (QYNV-1), titanium dioxide pigment (OR640A), 0.45% blown castor oil, 0.67% polyethylene glycol monolaurate, 1.12% petrolatum wax solution, 13.42% aromatic naphtha (Solvesso 100), 7.85% trimethylnonanone, and 3.35% ethylene glycol monobutyl ether.

The addition of 1.0% dimethylethanol amine (polyester/additive=17.1:1) to the coating composition greatly improved the metal marking resistance of the cured paint film over that of the control coating. The pigment volume concentration for the cured film is 17.6 vol. percent.

Example VI

A cross-linked polyester is made by reacting 18.6 parts of adipic acid, 33.5 parts neopentyl glycol, 31.7 parts isophthalic acid, 6.4 parts trimethylolpropane, and cross-linking the polyester with 10.9 parts hexakis (methoxymethyl) melamine. The resin is mixed with a solvent containing 80% xylene and 20% ethylene glycol monobutyl ether to make a polyester mixture containing 62.2% non-volatile material.

An organosol coating composition is formulated containing 21.90% of the above polyester mixture, 5.20% diisodecyl phthalate plasticizer, 17.30% polyvinyl chloride particles (QYNV-1), 27.70% titanium dioxide (Du Pont R902), 2.77% antimony oxide, 2.16% silica (Syloid 404 aerogel), 0.52% polyethylene glycol monolaurate, 0.35% lecithin, 5.46% diisobutyl ketone, 5.20% trimethylnonanone, 9.55% aromatic naphtha (Solvesso 150) and 1.04% heat stabilizer (Ferro 6V6A). The dried control coating has a pigment volume concentration of about 22 vol. percent.

Table I shows the results of comparison between baked control films made according to Example VI, containing no secondary or tertiary amine mark-reducing additive and films made from coating compositions containing various additive components.

TABLE I

| Amine additive | Additive content, percent | Polyester/ additive ratio | Improvement in metal marking resistance |
|---|---|---|---|
| Dibutyl isopropyl amine | 4 | 3.4:1 | Good. |
| Triisopropanol amine | 3.9 | 3.5:1 | None observed. |
| Triethylamine | 2.1 | 6.5:1 | Very good. |
| Dimethyl ethanol amine | 1.8 | 7.6:1 | Do. |
| Dibutyl amine | 0.3 | 45.7:1 | Good (slight yellowing of film). |
| Diisopropyl amine | 0.3 | 45.7:1 | Do. |

The effect of varying amine additive concentration is shown in Table II for the control coating composition of Example VI with decreasing amounts of triethyl amine.

TABLE II

| Triethyl amine concentration, percent | Polyester/additive ratio | Metal marking resistance |
|---|---|---|
| 5.7 | 2.4:1 | Very good. |
| 2.3 | 5.9:1 | Do. |
| 2.1 | 6.5:1 | Do. |
| 0.6 | 22.8:1 | Do. |
| 0.3 | 45.5:1 | Do. |
| 0.15 | 91.0:1 | Fair. |
| 0 | Control | Poor. |

The gloss of the dried film is not changed by adding small amounts of the mark-reducing additives. An organosol coating similar to that of Example II is formulated with various amounts of triethyl amine, and the surface gloss is measured at angles of 60° and 85° by a standard glossmeter method. Table III shows these unit measurements for uniformly coated aluminum panels having a 0.023-inch Bonderite intermediate coating. The coated panels were baked for 90 seconds at 400° F.

TABLE III

| Additive concentration (g./l.) | Gloss 60° | Gloss 85° | Metal marking resistance |
|---|---|---|---|
| 2.43 | 18 | 41 | Very good. |
| 0.63 | 20 | 40 | Do. |
| 0.32 | 24 | 43 | Do. |
| 0.16 | 24 | 42 | Fair. |
| 0 (control) | 25 | 42 | Poor. |

The above examples are set forth as specific embodiments of the invention, and are not intended to limit the scope of the inventive concept. Numerous other components can be added within the skill of the formulator to control specific properties of the paint composition. The amine additives can be used together with other amines or with other materials to enhance the mar and metal marking resistance of a film. Such other components include petrolatum, high molecular weight waxes (Polymekon), polyolefin gels, silicones, etc. The proportions of components are usually controlled to provide a coating composition viscosity in the range of about 200 to 10,000 centipoises (Brookfield) at 25° C.

While several of the polyesters used in this invention are dispersible in water, aqueous dispersions are not ordinarily used for continuous coil coating operations. Coating compositions containing water carriers are diffi-cult to use in reverse roller coating techniques because of foaming problems.

Elimination of all of the polyester resin from the thermoplastic-containing organosol coating compositions given in the examples results in loss of metal marking resistance. While the polymeric material can be all polyester with no other polymer present, some polyester must be present to obtain the benefit of improved metal marking resistance from the secondary or tertiary amines.

Numerous modifications can be made within the inventive concept, and there is no intent to limit the invention except as set forth in the following claims.

What is claimed is:

1. A coating composition consisting essentially of an organic liquid carrier; pigment; a resin binder comprising a polyester resin; and at least 0.15 g./l. of a mark-reducing agent comprising an amine having 2 to 12 carbon atoms and having the following structural formula :

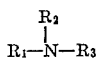

where $R_1$ and $R_2$ are selected from alkyl and hydroxy-alkyl radicals, and where $R_3$ is selected from hydrogen, alkyl and hydroxy-alkyl radicals.

2. The coating composition of claim 1 wherein the resin binder contains at least 20 weight percent of a saturated polyester prepolymer having free hydroxyl groups and wherein the coating composition contains sufficient alkoxyalkyl melamine cross-linking agent to cure the polyester prepolymer by baking.

3. The coating composition of claim 2 including thermoplastic resin particles dispersed in the liquid carrier, said thermoplastic resin comprising up to 80 percent of the resin binder.

4. The coating composition of claim 1 wherein the mark-reducing agent consists essentially of triethylamine.

5. The coating composition of claim 1 wherein the mark-reducing agent consists essentially of dimethylethanolamine.

6. The coating composition of claim 1 wherein the mark-reducing agent is present in the amount of about 0.15 to 40 g./l.

7. The coating composition of claim 1 wherein the pigment includes titanium dioxide.

8. A manufacturing process including the steps of applying to a metal substrate at least one layer of a coating composition consisting essentially of an organic liquid carrier, pigment, a resin binder comprising a saturated polyester resin prepolymer, a cross-linking agent, and at least 0.15 g./l. of an additive for improving metal-marking properties of the cured coating, said additive consisting essentially of secondary or tertiary amines containing 2 to 12 carbon atoms;
  curing the coating layer on the substrate by baking; and
  shaping the coated substrate by forming in contact with a hard surface; whereby the metal-marking properties of a coating surface produced from a composition containing the additive is substantially improved over a similar composition containing no such additive.

9. The process of claim 8 wherein the cured coating layer has a pigment volume concentration of about 7 to 40%.

10. The process of claim 9 wherein the pigment volume concentration is about 12 to 33%.

11. The process of claim 10 wherein the pigment volume concentration is about 20 to 25%.

12. The process of claim 8 wherein the coating composition contains between about 0.15 and 40 g./l. of the additive.

13. A method for reducing metal-marking properties of an organic resin coating comprising the steps of: applying to a substrate a coating of a composition comprising an organic carrier liquid, a pigment material, organic resin solids containing a polyester, and a mark-reducing additive consisting essentially of secondary or tertiary amine compounds having lower alkyl or lower hydroxyalkyl radicals, said composition having a weight ratio of polyester to additive between about 2:1 and 100:1; and curing the coating to produce a low gloss flexible film having high resistance to metal marking.

14. The method of claim 13 wherein the weight ratio of polyester to additive is about 2:1 to 50:1.

References Cited

UNITED STATES PATENTS 3,139,411   6/1964   Brockman et al. _____ 260—873

MORRIS LIEBMAN, Primary Examiner.

L. T. JACOBS, Assistant Examiner.

U.S. Cl. X.R.

117—132, 161; 260—32.6